3,766,137
STABILISED CHLORINATED RUBBER

Norman Leonard Watson, Runcorn, England, assignor to Imperial Chemical Industries Limited, London, England
No Drawing. Filed Aug. 11, 1971, Ser. No. 170,983
Claims priority, application Great Britain, Aug. 21, 1970, 40,421/70
Int. Cl. C08c 5/02; C08d 5/04, 11/04
U.S. Cl. 260—45.8 A                     6 Claims

ABSTRACT OF THE DISCLOSURE

A chlorinated rubber composition which comprises a stabilising amount of a cycloaliphatic epoxide.

---

This invention relates to stabilised chlorinated rubber compositions.

According to the invention there is provided a chlorinated rubber composition which comprises a stabilising amount of a cycloaliphatic epoxide (as herein defined).

By the term "cycloaliphatic epoxide" is meant a compound containing at least one epoxide group in which the epoxide oxygen atom is directly attached to two vicinal carbon atoms of a cycloaliphatic group. Most conveniently the cycloaliphatic group will be a cyclohexyl group so that the cycloaliphatic epoxide contains an epoxy-cyclohexyl group.

It is also desirable that the cycloaliphatic epoxide contains at least two epoxide groups, although epoxide oxygen atom of the second epoxide group need not be attached directly to carbon atoms of the cycloaliphatic group. An example of such a compound is 1-(epoxyethyl)-3,4-epoxy-cyclohexane. However it is particularly preferred that the compound contains two epoxy-cyclohexyl groups and an example of a suitable compound is 3,4-epoxycyclohexylmethyl - 3',4 - epoxycyclohexane carboxylate.

The composition will generally comprise at least 0.2% by weight of cycloaliphatic epoxide, for example 0.3% to 5% and preferably 0.4% to 2%.

The chlorinated rubber is generally one containing at least 50% by wight of chlorine, preferably at least 60% and usually approximately 65%. The chlorinated rubber may be a chlorinated natural or synthetic rubber, for example chlorinated polyisoprene. Suitable chlorinated rubbers are those sold under the trade name "Alloprene."

The invention is illustrated in the following example:

EXAMPLE 100 g. samples of various commercially available grades of chlorinated polyisoprene containing about 65% by weight of chlorine and sold under the trade name "Alloprene" were milled for two hours with, as stabiliser, 3,4-epoxy-cyclohexylmethyl - 3',4' - epoxycyclohexane carboxylate. The milling was carried out in a porcelain mill, 8 inches in length and 5 inches in diameter, containing 70 glass balls, each 1 inch in diameter.

For the purpose of comparison, samples were similarly prepared containing—

(a) no stabiliser
(b) an epoxidised vegetable oil sold under the trade name "Abrac" A, and
(c) an epoxide resin (bisphenol type) which is a bisphenol A-epichlorohydrin condensate resin sold under the trade name "Bakelite" VZ147.

The samples were then submitted to the following tests:

(1) Thermal stability 3 to 5 g. of chlorinated rubber was accurately weighed and placed between glass wool pads in a stability tube immersed in an oil-bath maintained at 175° C. A slow stream of air (about 12 l./h.) was passed up through the rubber and the evolved HCl passed into a drechsel containing distilled water neutralised to screened methyl orange. After 1 hour the contents of the drechsel were titrated with N/10 NaOH solution. From this the mg. HCl evolved per g. chlorinated rubber in 1 hour at 175° C., can be calculated. The less HCl that is evolved, the greater the thermal stability.

(2) Gelation stability 15 ml. of a 15% w./w. solution of chlorinated rubber in methylethylketone was placed in a 6 dram glass phial and 1 g. electrolytic iron powder added. The phial was stoppered and attached to the periphery of a 16 inch diameter wheel rotating at 11 r.p.m. The solution which was maintained at a temperature of 23° C. was periodically examined and the time for gelation to occur (in days) was measured. The longer this time, the greater the gelation stability.

(3) Chromium-copper corrosion

A 50% w./w. solution of chlorinated rubber in toluene was poured into a 6 inch x 1 inch diameter stoppered test tube to a depth of 1 inch and a 2 inch x ½ inch wide test strip of chromium-plated copper rotagravure plate was placed half in and half out of the solution. The tube was stoppered and immersed in a water-bath maintained at 50° C. The time (in days) to corrode the metal strip above and below the surface of the solution was noted.

(4) Steel ball corrosion

Twenty ¼ inch diameter degreased steel balls were added to 25 g. of a 20% w./w. solution of the chlorinated rubber in toluene. The time (in days) for the steel balls to show the first sign of and marked corrosion was noted.

(5) Can corrosion (toluene solution)

A 25% w./w. solution of chlorinated rubber in toluene was placed in a lidded tin can maintained at 25° C. The time (in days) for corrosion of the can above or below the surface of the solution was noted.

(6) Can corrosion (methylethylketone (MEK) solution

Similar to 5 above except that a 40% w./w. solution of the chlorinated rubber in methylethylketone was used.

The results are shown in the following table. The viscosity grade of the chlorinated rubber is given by the solution viscosity at 25° C. of a 20% w./w. solution in toluene.

TABLE

| Stabiliser | Concentration, weight percent | Thermal stability, Mg HCl per gram | Gelation (days) | Cr/Cu strip corrosion (days) | | Steel ball corrosion (days) | | Can corrosion in toluene (days) | | Can corrosion in MEK (days) | |
|---|---|---|---|---|---|---|---|---|---|---|---|
| | | | | Above | Below | First sign | Marked | Above | Below | Above | Below |
| 5 cp. viscosity chlorinated polyisoprene: | | | | | | | | | | | |
| None | | 6.4 | 1 | 1 | 1 | 5 | 7 | 1 | 6 | | |
| Epoxidised vegetable oil | 1 | 5.6 | 1 | 7 | 4 | 5 | 7 | 22 | 7 | | |
| Epoxide resin (bisphenol type) | 1 | 4.1 | 4 | 19 | 19 | 3 | 24 | >56 | 27 | | |
| Cycloaliphatic epoxide | 0.5 | 5.1 | 4 | 15 | 12 | 5 | 68 | >56 | >56 | | |
| Do | 1 | 4.2 | 4 | 25 | 10 | 5 | 106 | >56 | >56 | | |
| 10 cp. viscosity chlorinated polyisoprene: | | | | | | | | | | | |
| None | | 4.9 | 1 | 4 | 4 | 2 | 13 | 1 | 8 | | |
| Epoxidised vegetable oil | 1 | 4.2 | 4 | 19 | 11 | 6 | 13 | >56 | 8 | | |
| Epoxide resin (bisphenol type) | 1 | 2.8 | 4 | 13 | 14 | 6 | 20 | >56 | 42 | | |
| Cycloaliphatic epoxide | 0.5 | 3.1 | 4 | 27 | 19 | 6 | 13 | >56 | >56 | | |
| Do | 1 | 2.5 | 4 | 32 | 32 | 6 | 29 | >56 | >56 | | |
| 20 cp. viscosity chlorinated polyisoprene: | | | | | | | | | | | |
| None | | 5.4 | 6 | 1 | 1 | 2 | 13 | 1 | 5 | 2 | 2 |
| Epoxidised vegetable oil | 1 | 4.6 | 8 | 20 | 11 | 6 | 13 | >48 | 6 | 6 | 8 |
| Cycloaliphatic epoxide | 0.5 | 3.7 | 9 | 13 | 19 | 8 | 22 | >48 | >48 | 21 | 41 |
| Do | 1 | 3.5 | 22 | 22 | >40 | 13 | >42 | >48 | >48 | >42 | >42 |
| 125 cp. viscosity chlorinated polyisoprene: | | | | | | | | | | | |
| None | | 5.9 | 10 | 1 | 1 | 3 | 10 | 4 | 4 | | |
| Epoxidised vegetable oil | 1 | 5.2 | 27 | 37 | 13 | 3 | 10 | >62 | >62 | | |
| Epoxide resin (bisphenol type) | 1 | 4.0 | 31 | 55 | 13 | 3 | 10 | >62 | >62 | | |
| Cycloaliphatic epoxide | 0.5 | 5.0 | 51 | >71 | >71 | 10 | 52 | >62 | >62 | | |
| Do | 1 | 3.7 | 55 | >71 | >71 | 10 | >89 | >62 | >62 | | |

I claim:

1. A chlorinated rubber composition which comprises a stabilizing amount of 3,4-epoxycyclohexylmethyl-3',4'-epoxycyclohexane carboxylate.

2. A composition according to claim 1 which comprises at least 0.2% by weight of the epoxide.

3. A composition according to claim 2 which comprises 0.3% to 5% by weight of the epoxide.

4. A composition according to claim 3 which comprises 0.4% to 2% by weight of the epoxide.

5. A composition according to claim 1 in which the chlorinated rubber contains at least 50% by weight of chlorine.

6. A composition according to claim 5 in which the chlorinated rubber contains at least 60% by weight of chlorine.

References Cited

UNITED STATES PATENTS

| | | | |
|---|---|---|---|
| 2,166,604 | 7/1939 | Meyer | 260—735 |
| 2,537,627 | 1/1951 | Weissert et al. | 260—94.7 |
| 2,564,194 | 8/1951 | DeNie et al. | 260—45.8 |
| 2,669,549 | 2/1954 | Darby | 260—23 |
| 2,716,123 | 8/1955 | Frostick, Jr. et al. | 260—348 |
| 3,208,955 | 9/1965 | Proops | 260—2 |
| 3,406,140 | 10/1968 | Polestak et al. | 260—33.4 |
| 3,464,966 | 9/1969 | Watson | 260—94.7 |
| 3,525,730 | 8/1970 | Nutzel et al. | 260—94.7 |

DONALD E. CZAJA, Primary Examiner

R. A. WHITE, Assistant Examiner

U.S. Cl. X.R.

260—735